United States Patent
Marinucci

(10) Patent No.: US 7,900,094 B2
(45) Date of Patent: Mar. 1, 2011

(54) METHOD, SYSTEM AND COMPUTER PROGRAM FOR FACILITATING THE ANALYSIS OF ERROR MESSAGES

(75) Inventor: Francesco Marinucci, Rome (IT)

(73) Assignee: International Business Machines Corporation, Armonk, NY (US)

(*) Notice: Subject to any disclaimer, the term of this patent is extended or adjusted under 35 U.S.C. 154(b) by 345 days.

(21) Appl. No.: 12/119,969

(22) Filed: May 13, 2008

(65) Prior Publication Data

US 2008/0288830 A1 Nov. 20, 2008

(30) Foreign Application Priority Data

May 14, 2007 (EP) .................. 07108134

(51) Int. Cl.
*G06F 11/00* (2006.01)
(52) U.S. Cl. .............. 714/46; 714/26; 714/38; 714/48; 714/49; 714/57
(58) Field of Classification Search .......... 714/26, 714/38, 46, 48, 49, 57
See application file for complete search history.

(56) References Cited

U.S. PATENT DOCUMENTS

| 6,401,217 B1* | 6/2002 | Clark et al. .................. 714/20 |
| 2005/0081108 A1* | 4/2005 | Shabalin ..................... 714/38 |
| 2005/0193266 A1* | 9/2005 | Subramanian et al. ........ 714/38 |

* cited by examiner

*Primary Examiner* — Robert Beausoliel
*Assistant Examiner* — Charles Ehne
(74) *Attorney, Agent, or Firm* — Yee & Associates, P.C.; Jeffrey S. LaBaw

(57) ABSTRACT

A solution is proposed for managing a software application. A corresponding method starts with the step of detecting an error condition of the software application. An error message corresponding to the error condition is logged; the error message includes at least one available field for an information item of a corresponding category. For each available field, the information item of the corresponding category associated with the error message is collected; the information item is collected from one or more information sources, which are external to the software application. The error message is now completed by inserting each retrieved information item into the corresponding available field. At the end, the completed error message (or a part thereof) is output.

8 Claims, 4 Drawing Sheets

METHOD, SYSTEM AND COMPUTER PROGRAM FOR FACILITATING THE ANALYSIS OF ERROR MESSAGES

FIELD OF THE INVENTION

The present invention relates to the data processing field. More specifically, the present invention relates to the management of software applications.

BACKGROUND

The management of software applications is a very complex process. The problem is particularly acute in large data processing systems—for example, when the software applications run in heterogeneous network environments or have multi-tier structures.

In this context, a critical aspect is the management of any error condition that may occur during the use of each software application (for example, in a production environment). Typically, in this case the software application logs an error message that identifies the error condition (by means of a corresponding error code).

In order to facilitate the handling of the logged error messages, standard formats thereof have been proposed in the last years. For example, the Common Base Event (CBE) specification defines a set of common fields for all the error messages.

In any case, each error message is analyzed by a system administrator (for example, to try solving the corresponding error condition). A commonplace approach is to use the error code included in the error message to retrieve further information about the error condition that caused it. For this purpose, the system administrator may search the error code in manuals of the software application; the system administrator then reads any information provided by the manuals about the corresponding error condition.

However, this activity is very time consuming. Particularly, when the manuals are available in hard-copy form, the system administrator first of all must take the manuals (generally not readily available); s/he must then look up the error code in their index(es) and move to the corresponding pages for reading the provided information. Similar drawbacks are experienced when the manuals are available in soft-copy form. Indeed, some time is spent to locate the files storing the manuals and to load each one of them; moreover, a lot of time is also wasted when the manuals have not been installed on the system, so that they must be retrieved from a CD-ROM. In any case, the system administrator must again scroll the manuals to find the required information. An additional problem is that the manuals may be not up-to-date; this typically happens when the manuals are available in hard-copy form, but it is very common even when the manuals are available in soft-copy form (since generally their latest versions are never downloaded). Therefore, the obtained information may be not correct (for example, when it refers to a previous version of the software application).

Sometimes, the information provided by the manuals is not satisfactory. In this case, the system administrator typically accesses other information sources; for example, information about the error condition may be searched in customer support databases, in on-line forums, and the like. However, this activity requires even far more time; moreover, the obtained information may be inaccurate (especially when it is provided by an unofficial source).

In any case, the activity of analyzing the error condition is a substantial manual task; particularly, a deep investigation process is required by the system administrator to identify the information that is actually required within the available sources. Therefore, the quality of the obtained results strongly depends on the skill of the system administrator.

All of the above may have deleterious effects on business aspects relating to the software application (for example, when the correction of error conditions impacting critical business areas is delayed).

SUMMARY

In its general terms, the present disclosure is based on the idea of enriching the error messages to facilitate their analysis.

Particularly, different aspects of the invention provide a solution as set out in the independent claims. Advantageous embodiments of the invention are set out in the dependent claims.

More specifically, an aspect of the invention proposes a method for managing a software application. The method starts with the step of detecting an error condition of the software application. An error message corresponding to the error condition is logged; the error message includes at least one available field for an information item of a corresponding category. For each available field, the information item of the corresponding category associated with the error message is collected; the information item is collected from one or more information sources, which are external to the software application. The error message is now completed by inserting each collected information item into the corresponding available field. At the end, the completed error message (or a part thereof) is output.

In an embodiment of the invention, the error message conforms to a standard format (such as defined by the CBE specification).

Exemplary categories are indicative of an explanation of the error condition, of a consequence of the error condition and of an action for correcting the error condition.

A way to improve the solution is of exploiting a repository with a data structure (such as a record) storing the information items for selected error messages.

When the data structure for the (current) error message is not included in the information repository, the required information items are downloaded from one or more remote information sources (and a corresponding new data structure is added to the information repository).

Advantageously, the information items stored in the information repository are refreshed periodically.

It is also possible to associate a search context with each category within the information sources.

For example, the context may consist of a section (which is identified according to a comparison between a descriptor of the category and a header of the section).

Another aspect of the invention proposes a computer program for performing the above-described method.

A further aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
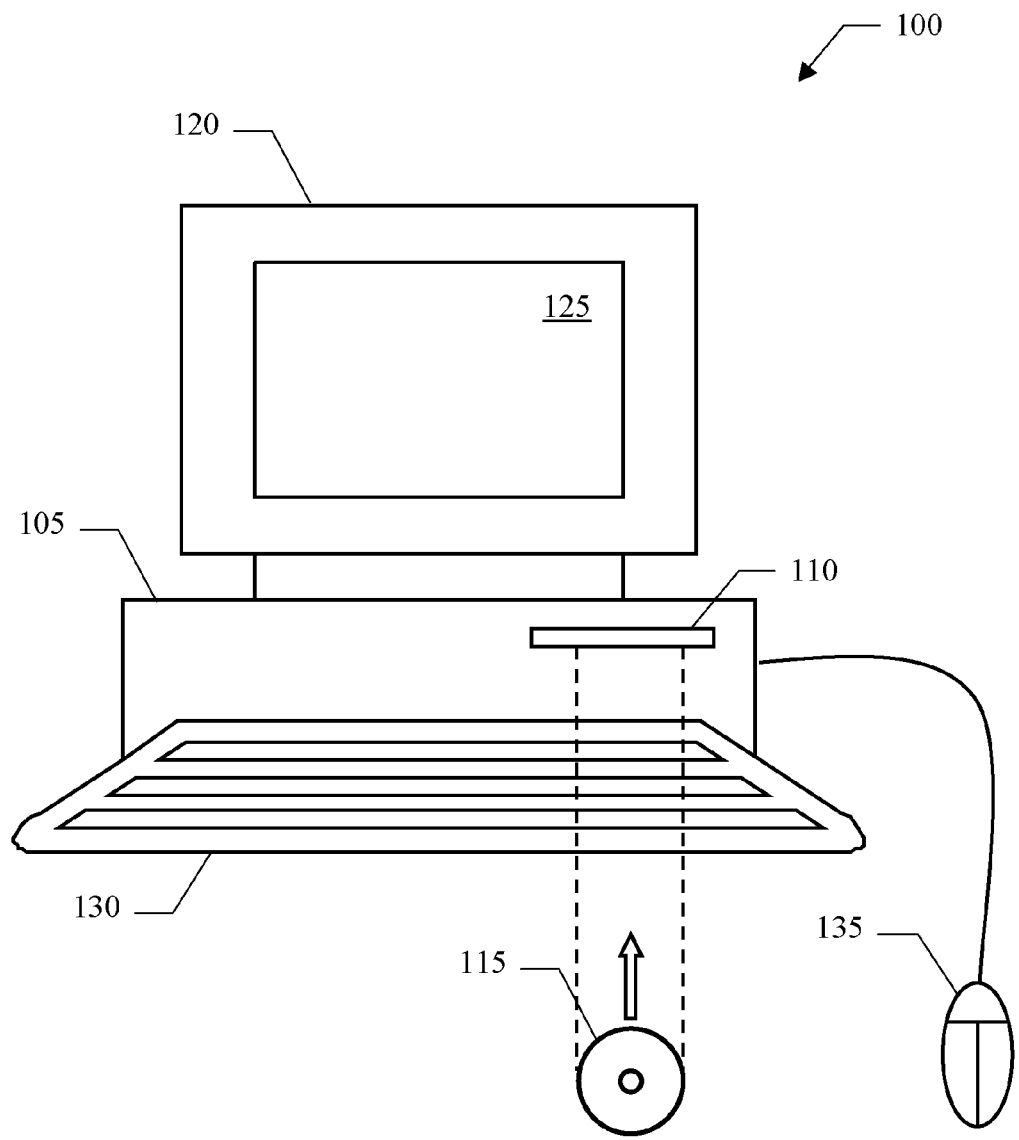
FIG. 1 is an illustrative representation of a data processing system in which the solution according to an embodiment of the invention is applicable.

With reference in particular to FIG. 1, a computer 100 is illustrated. The computer 100 includes a central unit 105, which houses the electronic circuits controlling its operation (such as a microprocessor and a working memory). The computer 100 is also provided with a hard-disk and a drive 110 for reading CD-ROMs 115. A monitor 120 is used to display information on a screen 125. Operation of the computer 100 is controlled by means of a keyboard 130 and a mouse 135, which are connected to the central unit 105 in a conventional manner. Typically, the computer 100 is connected to a network (not shown in the figure); for example, the computer 100 may consist of a server providing different services to clients that access it through the network.

Figure 2:
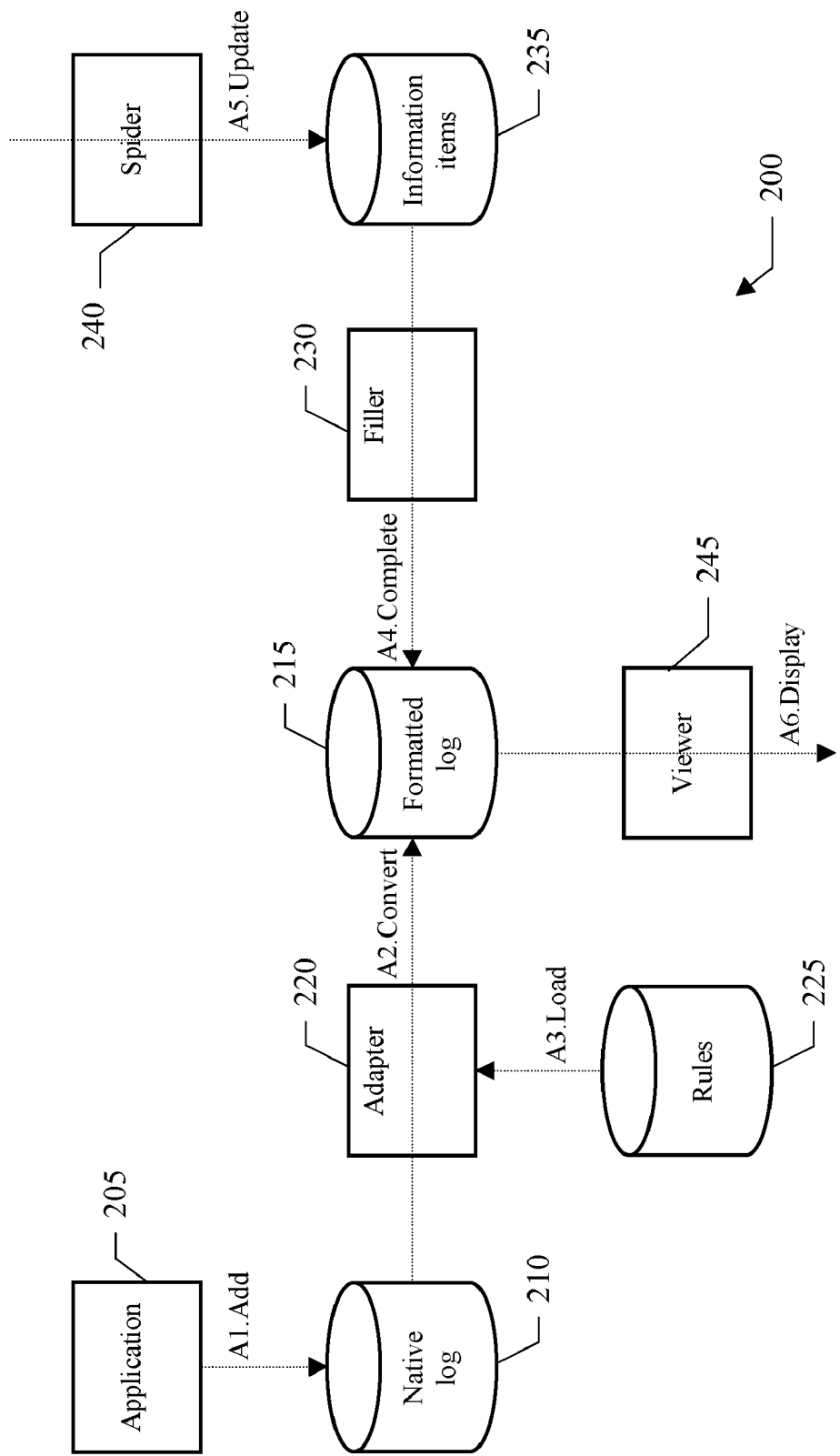
FIG. 2 is a collaboration diagram representing the roles of different software components that may be used to implement the solution according to an embodiment of the invention.

Moving now to FIG. 2, the main software components that run on the above-described computer are denoted as a whole with the reference 200. The information (programs and data) is typically stored on the hard-disk and loaded (at least partially) into the working memory of the computer when the programs are running, together with an operating system and other application programs (not shown in the figure). The programs are initially installed onto the hard disk, for example, from CD-ROM. Particularly, the figure describes the static structure of the system (by means of the corresponding components) and its dynamic behavior (by means of a series of exchanged messages, each one representing a corresponding action, denoted with sequence numbers preceded by the symbol "A").

More in detail, one or more software applications are installed on the computer; for the sake of simplicity, in the following reference will be made to a single application 205 (similar considerations apply to any additional application). For example, the application 205 consists of a web service, a license management application, a software distribution application, an access management application, and the like.

Whenever an error condition occurs during the running of the application 205, a corresponding error message is added to a log 210 (action "A1.Add"). The error messages in the log 210 have a native format defined by the application 205 (for example, including an error code, a time-stamp, the name of a module casing the error condition, and the like).

Each (native) error message in the (native) log 210 is converted into a formatted error message, which is stored into a corresponding formatted log 215 (action "A2.Convert"). For example, the formatted error messages conform to the CBE specification. Generally speaking, the CBE specification defines a mechanism for managing events in an autonomic computing environment. For this purpose, the CBE specification defines a standard format for representing the events (including the encapsulated information generated as a result of any occurrences). Particularly, each event is represented with an object that includes predefined elements with corresponding attributes; the objects are stored into an XML file conforming to a schema defined by the CBE specification. In the scenario at issue, each formatted error message has a plurality of dedicated fields for predefined information items (such as the above-mentioned error code, time-stamp, and module name). The CBE specification also provides extensions fields (defined by the "extendedDataElements" attribute), which may be used to store customized information items (for example, being specific for the application or its publisher). The conversion of the native error messages (from the log 210) into the formatted error messages (to the log 215) is performed by an adapter 220. In the example at issue (wherein the formatted error messages conform to the CBE specification), this result is achieved by means of a Generic Log Adapter (GLA); the GLA is an engine that operates according to a set of predefined conversion rules, which are loaded from a corresponding database 225 (action "A3.Load"). The conversion rules (defined by regular expressions) describe a mechanism for populating the relevant fields of each formatted error message with one or more portions of the corresponding native error message.

In the solution according to an embodiment of the present invention, as described in detail in the following, each formatted error message is completed with additional information items. For this purpose, there are exploited one or more available fields of the formatted error message (each one for an information item of a corresponding category). The information items associated with the formatted error message are collected from one or more information sources, which are external to the application (such as a repository, a web site, and the like).

The proposed solution strongly facilitates the activity of analyzing any error message. Indeed, no additional effort is required to a system administrator to retrieve further information about the corresponding error condition (for example, from manuals, customer support databases, or on-line forums). This drastically reduces the time that is spent by the system administrator for analyzing the error message (since s/he can access the required information immediately).

In this way it is possible to avoid (or at least reduce) the risk of using information that is not correct or inaccurate. For example, the system may ensure that the information items are always collected from the latest versions of the manuals; moreover, it is possible to select the information sources only among structures that are official, or in any case with an acceptable degree of reliability.

All of the above makes the process of analyzing the error messages less dependent on the skill of the system administrator; this has a beneficial impact on the quality of the obtained results.

Moreover, the proposed solution allows limiting the negative effects of the error conditions on business aspects relating to the application (for example, by reducing the time required to correct error conditions impacting critical business areas).

In an embodiment of the invention, the desired result is achieved by exploiting the extension fields of each formatted error message. For example, specific extension fields may be dedicated to categories of information items indicative of an explanation of the corresponding error condition, of a consequence of the error condition and/or of an action for correcting the error condition, respectively.

For this purpose, a filler 230 is provided. The filler 230 accesses an information repository 235, which stores a record for each one of a set of selected error messages (for example, relating to the more common error conditions); each record stores the information items associated with the selected error message (of the categories for the extension fields). The filler 230 completes the formatted error message with the information items that are extracted from the corresponding record in the information repository 235 (action "A4.Complete"). In this way, the required information items are directly available to the filler 230; as a consequence, the desired result is obtained in a very short time.

A spider 240 is in charge of maintaining the information repository 235 up-to-date (action "A5.Update"). For example, as described in detail in the following, the spider 240 adds a new record to the information repository 235 whenever it is not available for a formatted error message being added to the log 215; in addition or in alternative, the spider 240 periodically refreshes all the information items stored in the records included in the information repository 235. In any case, for this purpose the spider 240 downloads the required information items from one or more remote information sources (for example, in the Internet).

A viewer 245 is used to display the formatted error messages—after their completion with the required information items (action "A6.Display"); for example, the viewer 245 consists of the Log & Trace Analyzer for Java Desktop (LTAJD). Typically, the viewer 245 displays a tabbed pane window with multiple overlying panels (resembling a stack of pieces of paper lying on top of one another, with only the topmost panel that is visible); a selection tab is attached to each panel, so as to allow selecting the tab corresponding to the panel to be shown (which is then popped up and moved to the top of the stack). Particularly, in this case a panel is associated with the (dedicated) CBE fields, and another panel is associated with the extension fields; in this way, the system administrator may directly view the entire information that is required to analyze each completed (formatted) error message—by simply clicking on the corresponding tab. Moreover, this information is provided in a structured format (for example, with each information item that is displayed in a corresponding box). All of the above further facilitates the analysis of the completed error message.

Figure 3A:
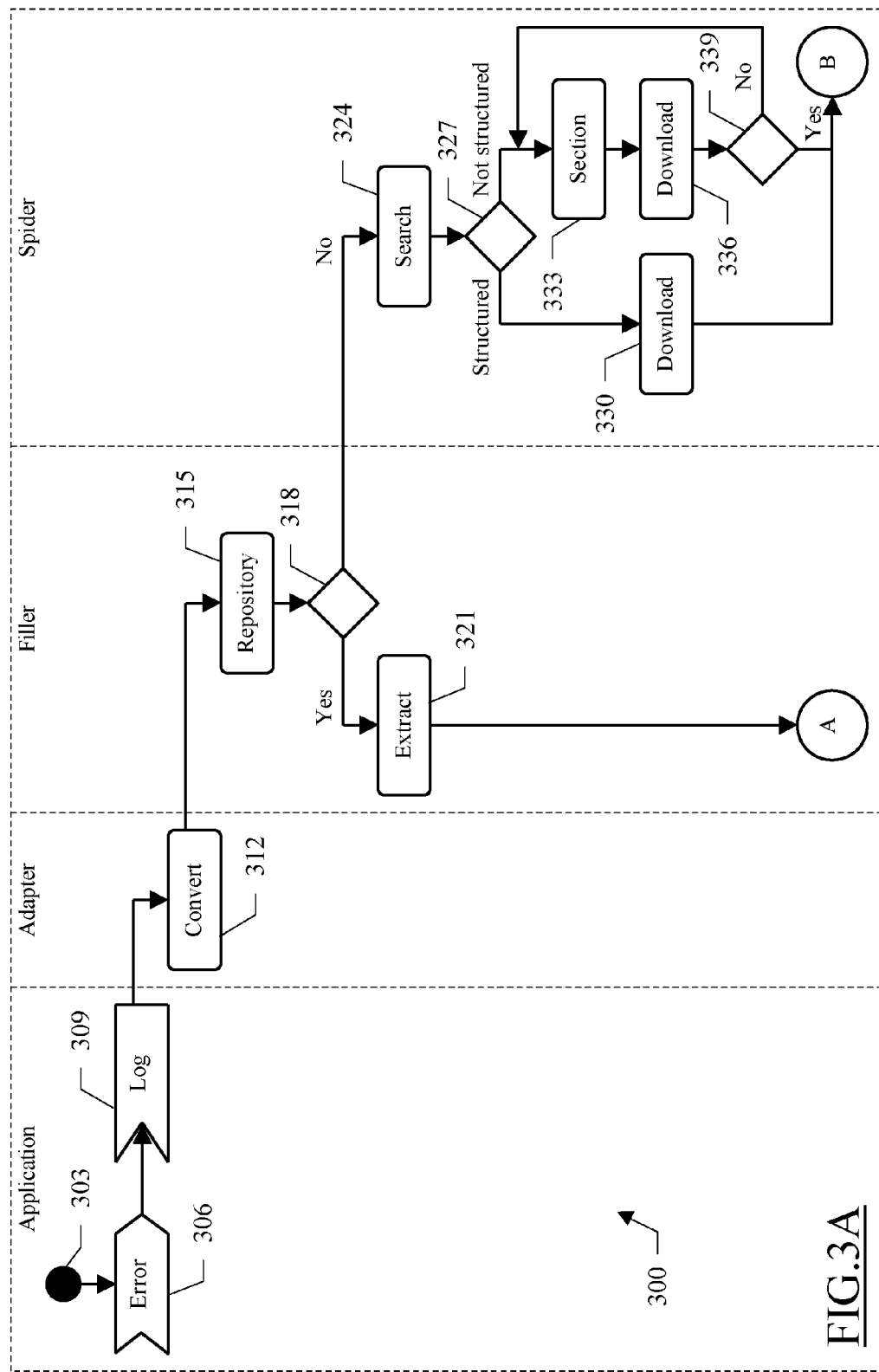
FIGS. 3A-3B show a diagram describing the flow of activities relating to an implementation of the solution according to an embodiment of the invention.
Figure 3B:
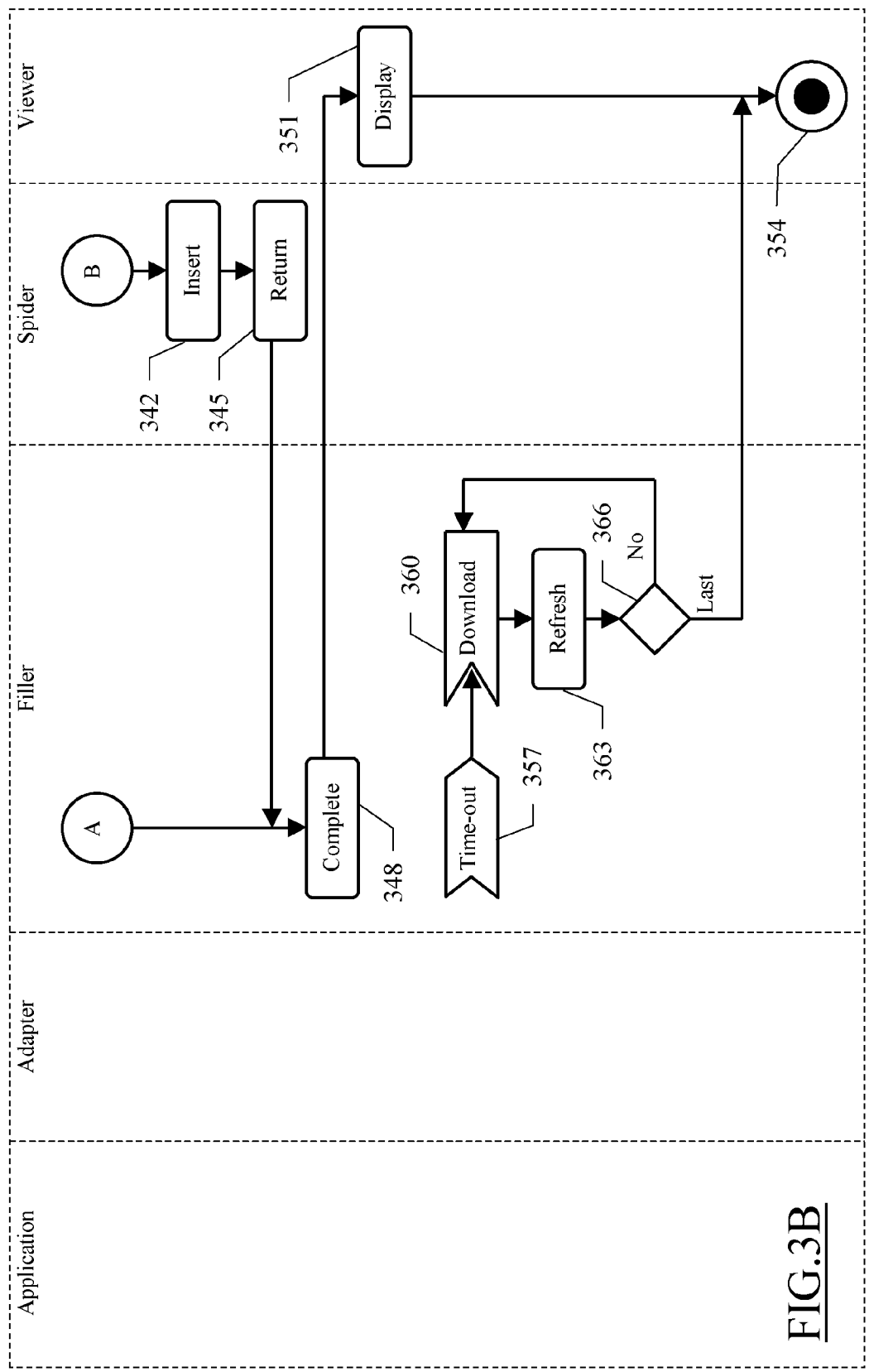

Considering now FIGS. 3A-3B, the logic flow of an exemplary process that can be implemented in the above-described system (to manage any error condition) is represented with a method 300.

The method begins at the black start circle 303 in the swim-lane of the application, and the passes to block 306. As soon as an error condition occurs, this event is detected and the corresponding native error message is logged at block 309. The flow of activity then continues to block 312 in the swim-lane of the adapter, wherein the native error message is converted into the corresponding formatted error message (by applying the relevant conversion rules).

Proceeding to the swim-lane of the filler, the record for the formatted error message is searched in the information repository at block 315. The flow of activity then branches at decision block 318 according to the result of the search. The block 321 is executed if the record for the formatted error message is found, whereas the blocks 324-345 are executed otherwise; in both cases, the method then merges at block 348.

Considering now the block 321 (record found), the information items stored in the record are extracted; the branch then ends directly to the block 348.

With reference instead to the block 324 (record not found), the method passes to the swim-lane of the spider, which searches the required information items associated with the formatted error message in remote information sources. For example, the spider is configured to access a web site of a publisher of the application (with on-line manuals of the application and/or corresponding forums), a customer support database, a web searching engine, and the like. The information sources are accessed in a decreasing order of preference, starting from the information sources that are committed to provide the information items in a structured form, and then passing to any other information sources (wherein the information items are available in an unknown format).

The method then verifies at block 327 whether an information source providing the information items associated with the formatted error message in a structured form has been found. If so, the block 330 is executed, whereas on the contrary the blocks 333-339 are executed; in both cases, the method then descends into block 342.

With reference now to the block 330 (information items in structured form), the information items (of the categories for the extension fields) are downloaded from the information source directly. The branch then ends to the block 342.

With reference instead to the block 333 (information items not in structured form), a loop is executed for each category of the extension fields. The loop begins by identifying a section of the information source corresponding to the (current) category. This result is achieved by comparing a descriptor of the category (for example, consisting of one or more keywords) with a header of the different sections of the information source; for example, the sections consist of chapters of a manual (wherein the headers are their titles), e-mails of a forum (wherein the headers are their subjects), HTML pages of a web site (wherein the headers are included in their code), and the like. The section is selected (among the available ones) so as to maximize the probability of finding the desired information items within it (by default, when no sections with the corresponding headers can be identified, the whole information source is selected). Proceeding to block 336, the information item (of the current category) associated with the formatted error message is retrieved in the selected section and then downloaded. The method then verifies at block 339 whether the categories for all the extension fields have been processed. If not, the flow of activity returns to the block 333 to repeat the same operations for the category of a next extension field. On the contrary, the branch ends to the block 342.

Considering now the block 342, a new record for the formatted error message is added to the information repository; the new record is populated with the downloaded information items of the category for each extension field. Moreover, at block 345 the spider returns the same information items to the filler (and then descends into the block 348).

The jointed flow of activity (block 348 in the swim-lane of the filler) now involves the completion of the formatted error message with the corresponding information items (extracted from the information repository at the block 321 or returned by the spider at the block 345); for this purpose, each information item is inserted into the corresponding extension field (for its category).

Moving now to the swim-lane of the viewer, the completed error message so obtained is displayed at block 351—with the system administrator that can browse all the logged completed error messages (with the required information items). The method then descends into the concentric white/black stop circles 354.

Returning to the swim-lane of the filler, in a completely asynchronous way the method passes from block 357 to block 360 when a predefined time-out expires (for example, every week). In response thereto, a loop is executed for each record included in the information repository. The loop begins by downloading the information items—associated with the selected error message of the (current) record—of the categories for its extension fields; preferably, the operation is limited only to the information items that have changed since the last iteration of the process. For this purpose, the same operations described above at the blocks 324-339 are repeated (so that their explanation is omitted for the sake of simplicity). Continuing to block 363, the information items stored in the record are refreshed according to the corresponding information items that have been downloaded (for example, by simply replacing them in the record). The method then verifies at block 366 whether all the records included in the information repository have been processed. If not, the flow of activity returns to the block 360 to reiterate the same operations on a next record. On the contrary, the method ends at the concentric white/black stop circles 354.

In this way, the information items (which are used to complete each formatted error message) are always the latest available ones when they are not included in the information repository (since they are downloaded upon request); conversely, when the information items are directly extracted from the information repository their age is at most equal to the period of the above-described refresh process. This provides a good compromise between the opposed requirements of high accuracy (provided by the latest versions of the information items) and high response speed (provided by the information items pre-fetched into the information repository).

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

Moreover, the same concepts may also be applied to any other software application (even of the stand-alone type). Likewise, the technical idea is applicable to manage whatever error condition in the broadest meaning of the term—i.e., referring to any unexpected condition (for example, requiring a human intervention, indicating the failure of an operation, or providing a simple warning). Anyway, the error conditions may be detected in any other operative condition of the software application (for example, during its installation, test, and the like).

Even though reference has been made to specific information sources, this is not to be interpreted in a limitative manner. For example, similar information items may also be collected from web services, dedicated storage devices, and the like; moreover, nothing prevents limiting the search to a single predefined information source.

Of course, the above-described displaying of the completed error messages is merely illustrative. Indeed, the proposed solution lends itself to be put into practice even when the whole completed error message is displayed directly, or when the desired information is output in any other way (for example, on a printer).

Similar considerations apply if the application directly provides the formatted error messages (so that no adapter is required). In any case, the same concepts are also applicable to formatted error messages conforming to a different specification, or more generally to whatever error messages having one or more fields available to store the required information items (for example, simply in predefined positions of a string).

Nothing prevents providing a different number of extension fields (down to a single one). Moreover, the extension fields may be used for other categories of information items (for example, indicative of hints for solving the corresponding error conditions).

The information repository may be replaced with any other physical or logical device including equivalent data structures (for example, a simple file). Anyway, the information repository may be populated with more sophisticated algorithms; for example, it is possible to include the records for error messages with the higher probability of occurrence (estimated centrally by collecting information about the running of difference instances of the application). However, this feature is not strictly necessary and it may be omitted in a simplified implementation of the invention (wherein the information items are always downloaded upon request).

Similar considerations apply if the information items are downloaded from other information sources (for example, a web site of the "wiki" type). Moreover, nothing prevents only using the downloaded information items to complete the corresponding formatted error message, without adding a new record to the information repository (which is instead maintained in a completely independent way).

Of course, it is possible to refresh the information items included in the information repository with any other periodicity (for example, after a predetermined number of error messages being logged). However, in an alternative implementation of the invention the records may be refreshed whenever they are accessed (for example, if they have been changed after their last refreshing).

Different sections of each information source (for the categories of the extension fields) may be exploited (for example, consisting of corresponding files or tables); more generally, it is possible to associate a search context (in the information source) with each category (for example, being defined by different web services of the same provider). Moreover, similar considerations apply if any other algorithm is used for searching the required information items within each section (for example, by exploiting standard web searching engines).

Likewise, equivalent descriptors of the categories may be provided (for example, with a hierarchical structure); moreover, it is possible to use more sophisticated algorithms for matching the headers of the sections (in the broadest meaning of the term) with the descriptors of the categories (for example, based on linguistic techniques).

In any case, this additional feature is only optional, and it may be omitted in several implementations of the inventions—wherein the information items are always searched in the whole information source(s).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

The proposed method may also be carried out on a system having a different topology or including equivalent units (down to a stand-alone computer). Moreover, the computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like), or with a combination thereof (such as a client/server architecture, a grid computing infrastructure, and the like).

The invention claimed is:

1. A method for managing a software application, the method including:
   detecting an error condition of the software application,
   logging an error message corresponding to the error condition, the error message including at least one available field for an information item of a corresponding category,
   for each available field collecting the information item of the corresponding category associated with the error message, the information item being collected from at least one information source external to the software application, wherein the at least one information source includes an information repository associated with the software application,
   in response to a data structure for the error message being included in the information repository, completing the error message by inserting each collected information item into the corresponding available field,
   in response to the data structure for the error message being not included in the information repository:
      for each available field downloading the information item of the corresponding category associated with the error message, the information item being downloaded from at least one remote information source, and
      adding a new data structure for the error message to the information repository, the new data structure storing the downloaded information item of the corresponding category for each available field, and
   outputting at least part of the completed error message.

2. The method according to claim 1, wherein the error message conforms to a standard format including a set of dedicated fields for predefined information items and a set of extension fields for customized information items, the at least one available field being included in the extension fields.

3. The method according to claim 1, wherein the information item of the category for the at least one available field is indicative of an explanation of the error condition, of a consequence of the error condition and/or of an action for correcting the error condition.

4. The method according to claim 1, further including:
   periodically downloading the information item for the category of each available field associated with each selected error message from the at least one remote information source, and
   refreshing each information item stored in the data structure for each selected error message in the information repository according to the corresponding information item being periodically downloaded.

5. The method according to claim 1, wherein for each available field, collecting the information item of the corresponding category associated with the error message includes:
   associating a context with the category within each information source, and
   searching the information item in the associated context.

6. The method according to claim 5, wherein each information source includes a plurality of sections each one having a header, and associating a context with the category within each information source includes:
   identifying the section corresponding to the category according to a comparison between a predefined descriptor of the category and the corresponding header.

7. A computer readable storage medium storing computer executable code thereon to perform the method for managing a software application when the computer program is executed on a data processing system the method including:
   detecting an error condition of the software application,
   logging an error message corresponding to the error condition, the error message including at least one available field for an information item of a corresponding category,
   for each available field collecting the information item of the corresponding category associated with the error message, the information item being collected from at least one information source external to the software application, wherein the at least one information source includes an information repository associated with the software application,
   in response to a data structure for the error message being included in the information repository, completing the error message by inserting each collected information item into the corresponding available field,
   in response to the data structure for the error message being not included in the information repository:
      for each available field downloading the information item of the corresponding category associated with the error message, the information item being downloaded from at least one remote information source, and
      adding a new data structure for the error message to the information repository, the new data structure storing the downloaded information item of the corresponding category for each available field, and
   outputting at least part of the completed error message.

8. A system including processor and memory for managing a software application comprising:
   means for detecting an error condition of the software application,
   means for logging an error message corresponding to the error condition, the error message including at least one available field for an information item of a corresponding category, for each available field, means for collecting the information item of the corresponding category associated with the error message, the information item being collected from at least one information source external to the software application, wherein the at least one information source includes an information repository associated with the software application, in response to a data structure for the error message being included in the information repository, means for completing the error message by inserting each collected information item into the corresponding available field, in response to the data structure for the error message being not included in the information repository:

for each available field means for downloading the information item of the corresponding category associated with the error message, the information item being downloaded from at least one remote information source, and means for adding a new data structure for the error message to the information repository, the new data structure storing the downloaded information item of the corresponding category for each available field, and means for outputting at least part of the completed error message.

* * * * *